United States Patent [19]

Piazza

[11] Patent Number: 4,958,305
[45] Date of Patent: Sep. 18, 1990

[54] POLYGON EDGE CLIPPING

[75] Inventor: Thomas A. Piazza, Fort Orange, Fla.

[73] Assignee: General Electric Company, Syracuse, N.Y.

[21] Appl. No.: 116,708

[22] Filed: Nov. 4, 1987

[51] Int. Cl.$^5$ ............................................. G06F 15/72
[52] U.S. Cl. ................................... 364/522; 364/521
[58] Field of Search ................ 364/521, 522; 340/724, 340/729, 734

[56] References Cited

U.S. PATENT DOCUMENTS

4,698,779  10/1987  Holden et al. .................... 364/522 X

Primary Examiner—Gary V. Harkcom
Assistant Examiner—Mark K. Zimmerman
Attorney, Agent, or Firm—Paul Checkovich; Richard V. Lang

[57] ABSTRACT

A method for clipping a source polygon to a view window permits the valid (i.e. potentially visible) edges or portions of edges of the source polygon and of the view window boundary edges to be sequentially output for further processing, while determining the valid parts in a predetermined direction around the perimeter of the source polygon, without having to store (other than for a first entry point) the value of exit points from or entry points to the view window. Only an end point of an edge of the source polygon is considered at a time so that a maximum of two intersection point determinations between the source polygon edge and view window boundary planes outside of which the source polygon edge lies are required to ascertain if a portion of the source polygon edge is valid.

12 Claims, 7 Drawing Sheets

POLYGON EDGE CLIPPING

BACKGROUND OF THE INVENTION

This invention relates to polygon edge clipping and, more particularly, to clipping edges of a polygon in two dimensions, wherein the resulting clipped edges may be sequentially output without need to store edge values.

In computer image generation (CIG), polygons, or faces, having a predetermined three dimensional spatial relationship are used to represent objects and features of images to be displayed. An example of CIG may be had by reference to U.S. Pat. No. 3,892,051 - Bunker, assigned to the instant assignee.

For objects that are defined in a three-dimensional environment, it is generally necessary to clip or truncate edges of the polygons during some stage of image processing so that an appropriate perspective view may be displayed by a two-dimensional display device, such as a cathode ray tube. A clipping system which clips in three-dimensional space is described in U.S. Pat. No. 3,816,726 - Sutherland et al, while one which clips in two-dimensional space is exemplified by U.S. Pat. No. 3,892,051 - Bunker. The present invention may be considered as more closely related to the one of the Bunker patent, since it is intended to clip in two-dimensional space.

For the system described in the aforementioned U.S. Pat. No. 3,892,051 - Bunker, only face edges that cross a window boundary plane and also intersect a window edge are clipped. All clip points are in the two-dimensional window plane. No attempt is made to close the clipped polygon about the window because the associated display processor only requires left edge information to start displaying a polygon. Faces open to the right are terminated by line reset pulses timed to occur as a line trace coincides with the right edge of the display window. If no left hand start information is available (e.g. polygon larger than the entire display window), then a pseudo-edge coinciding with the left edge boundary of the display window is established for providing a start trace reference.

A method for clipping lines is disclosed in U.S. Pat. No. 3,639,736 - Sutherland, wherein repetitive operations using the mid-point of a line segment determine the portion of the line segment, if any, lying outside a rectangular window.

When clipping to the field of view dictated by a viewpoint and the boundary edges of a view window, it may be necessary to determine boundary edges or portions thereof, that correspond to the top, bottom, left and right side of a square or rectangular view window. Of course, other shaped view windows may be employed and appropriate processing may be determined by one of ordinary skill in the art using the teachings of this application. As described in conjunction with the Bunker patent above, only the left side edge or pseudo-left-edge of a square or rectangular view window was required.

Further, since clipping must be performed in real time for a real-time CIG system that is typically used as a training vehicle, it is desirable to increase the speed at which polygons can be clipped by employing a more efficient method for clipping, such as by avoiding clipping that provides redundant information. An increase in speed of clipping permits more detail per object (resulting in a more realistic image) and/or more objects to be displayed in a scene. Also, it is desirable to sequentially output edge identifiers of the clipped polygon during processing of the original or source polygon, so that store and retrieve cycle times are eliminated.

Accordingly, it is an object of the present invention to provide a method for clipping a polygon in two dimensions wherein the resulting clipped segments may be more rapidly obtained than from known methods.

Another object is to provide a method for clipping a polygon in two dimensions at view window boundary planes wherein the valid portions of all window boundary edges for the resulting clipped figure may be readily determined.

Yet another object is to provide a method for establishing the valid portion of boundary edges of the view window that lie between the edges of a polygon entering and/or exiting the view window without having to calculate the equation of the view window boundary edges.

Still another object is to provide a method for clipping a polygon wherein edges for the resulting clipped figure may be sequentially output as they are determined without having to store all intersection points.

SUMMARY OF THE INVENTION

In accordance with the present invention, a method for clipping in two dimensions a source polygon that is defined in three dimensions includes projecting edges of the polygon onto the view window plane. At any moment, only one end point of the edge of the polygon is considered. If the one end point under consideration does not lie within the view window, the edge is clipped to the first view window boundary plane outside of which the one end point lies. If the edge clip point with the first boundary plane does not lie on a window edge, then the edge is clipped to the second view window boundary plane outside of which the one end point lies. When the one end point does not lie outside a second boundary plane the edge is disregarded from further consideration. If the edge clip point with the second boundary plane does not lie on a window edge, then the edge is disregarded from further consideration and the next succeeding edge encountered in a predetermined direction around the perimeter of the source polygon is processed. An end point of an edge of the source polygon is considered, since the end point can lie outside a maximum of two boundary planes of a square or rectangular view window.

Thus, a portion of the edge is declared valid, i.e. within the view window, when the clipping occurs on a view window edge, or the entire edge is declared invalid and is removed from further consideration, without having to consider the remaining portion of the edge, when the clip points with the first and second (if any) boundary planes outside of which the end point lies do not lie on a view window edge. As used herein, the term "view window boundary plane" is equivalent to "view window boundary line", since clipping is performed in two dimensions. A view window boundary line lies coincident with a view window edge, which may not necessarily be the edge of a viewing screen, and extends indefinitely beyond the edge.

Increased processing efficiency is realized using the present invention since at least half of the non-trivial deletions (i.e. those in which the edge crosses at least one boundary plane and further in which both end points of the edge do not lie outside the same view window boundary plane) of edges from further consideration are detected while using fewer than half the computation steps of other known clipping schemes. Processing end points of edges in accordance with the present invention obtains improved efficiency because a vertex (or end point) can not lie outside more than two boundary planes of a four-sided view window, while an edge can lie outside up to four boundary planes of a four-sided view window. Hence, for the present invention a maximum of two clipping operations or edge/boundary plane intersection determinations are required for ascertaining if any portion of the edge of the source polygon is valid i.e. lies within the view window.

Edge descriptors of source polygons, typically an ordered list of vertices of the polygons, may be stored in a data base and are defined either in a sequential clockwise or counterclockwise direction around the polygon. In the present application, it is assumed that the edges are defined in a clockwise direction, although the principles and teachings of the present invention are of course applicable to edges defined in a counter-clockwise direction.

Starting at an arbitrarily selected vertex of the polygon, or first end point of a polygon edge, processing proceeds in a clockwise direction around the polygon. When an edge of a polygon exits the view window, i.e. passes from within the view window across a view window boundary plane, the intersection point of the edge with the boundary plane it first crosses is identified and is assigned an exit code. Also the second end point of the edge is replaced with the intersection point determined, thereby effectively clipping and disregarding the portion of the edge between the exit intersection point and the second end point that lies outside the view window. End points of edges are tested in a sequential clockwise direction and when another edge of the polygon is determined to enter the view window, i.e. passes from outside the view window across a view window boundary plane at a window edge, the intersection point of the edge with the boundary plane it last crossed is identified and is assigned an entry code. Also the first end point of the edge is replaced with the entry intersection point determined, thereby effectively clipping and disregarding the portion of the edge that lies outside the view window between the first end point and entry intersection point. Of course, an analogous procedure may be followed should the first window edge intersection point encountered be an entry point rather than an exit point. The process of testing end points of polygon edges is repeated until the edge that includes the first end point tested as the second end point of the edge is tested.

From the entry and exit codes assigned to the intersection points of edges of the source polygon with boundary planes of the view window, valid portions of boundary edges from the display window for the clipped figure are derived in window coordinates, not from the original three-dimensional polygon. In other words, valid window boundary edges or portions thereof, i.e. those forming at least a part of the perimeter of the clipped polygon, are determined based on the edges or portions thereof of the source polygon remaining after processing and clipping, without consideration for any source polygon edges or portions thereof that lie outside the view window.

Increased efficiency is achieved because all edges or portions thereof of the source polygon that lie outside the view window are immediately dismissed from further consideration or processing since they are not required to formulate the perimeter of the clipped figure remaining within the display window. Further, equations for the valid portion of the boundary edges need not be calculated, but rather are obtained from appropriate constants in response to the exit and entry codes assigned to, and location of, the intersection points between edges of the source polygon and window boundary edges. In addition, it is not necessary to store values of the points of intersection between source polygon edges and view window boundaries, except for that of the initial intersection point determined if it is identified as an entry point.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1:
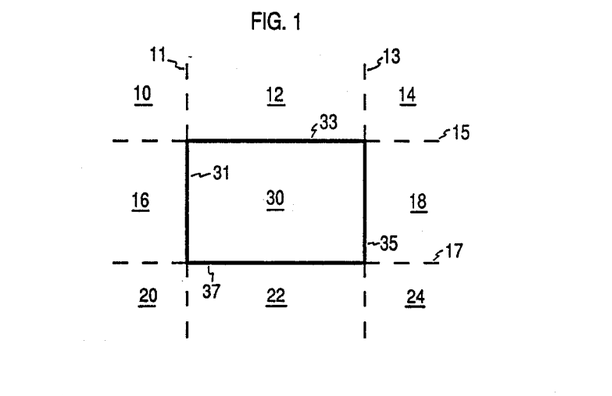
FIG. 1 is a diagram showing a view window along with the boundary planes associated with the edges thereof.

Referring to FIG. 1, a diagram of a view window, along with the boundary planes associated with the edges thereof, is shown. A quadrilateral view window 30, having a left side 31, top side 33, right side 35 and bottom side 37, is typically square or rectangular. Of course, other quadrilateral configurations and windows having a different number of sides may be used. The references right, left, top and bottom are used for ease of description, it being understood that illustrated rectangular window 30 may assume any orientation. Window edge boundary planes 11, 15, 13 and 17 coincide with window edges 31, 33, 35 and 37, respectively, and extend indefinitely beyond the corners of view window 30 for defining zones or sectors 10, 12, 14, 16, 18, 20, 22 and 24 covering all space in the plane within and without view window 30.

Top left zone 10, top middle zone 12 and top right zone 14 define the area that is outside top boundary plane 15. Top right zone 14, middle right zone 18 and bottom right zone 24 constitute the area that is outside right boundary plane 13. Bottom left zone 20, bottom middle zone 22 and bottom right zone 24 define the area that is outside bottom boundary plane 17. Top left zone 10, middle left zone 16 and bottom left zone 20 constitute the area that is outside left boundary plane 11. It is noted that points which are inside all boundary planes 11, 13, 15 and 17 fall within view window 30. For purposes of this discussion, a point lying on a boundary edge of window 30 is considered as lying within window 30. Further, a point lying in zones 12, 16, 18 and 22 is outside only one plane, i.e. planes 15, 11, 13 and 17, respectively. In addition, a point lying in zones 10, 14, 20 and 24 lies outside two planes, i.e. planes 11 and 15, planes 13 and 15, planes 11 and 17, and planes 13 and 17, respectively. Since zones 10-24 account for all planar space except for view window 30, the maximum number of boundary planes outside of which a point can lie is two.

Referring to FIGS. 2A-2D, examples of clipping in accordance with the present invention are shown. All polygons shown in FIGS. 2A-D are depicted with respect to view window 30 as they would appear in two-dimensions, i.e. planar. It is assumed that all appropriate processing as is known in the art that is necessary to transform a polygon from a three-dimensional environment to two-dimensional space has been performed.

Polygons, three-dimensional descriptors of which are typically stored in a data base, are generally defined in accordance with a predetermined set of rules. For the following discussion a source polygon is designated to be closed and convex with the vertices assigned in a clockwise direction around the polygon. The valid edges or portions thereof of the polygon within the view window may be readily determined in accordance with the present invention by following a clockwise path around the perimeter of the source polygon after starting at an arbitrarily selected vertex.

When processing in accordance with the present invention, each vertex of the source polygon represents the end point of two edges: A first encountered end point of one edge and a second encountered end point of another edge. In prior systems, such as exemplified by U.S. Pat. No. 3,816,726, valid edges of the clipped figure from the clipping processor were not available to be supplied to the display processor in sequence during clipping processing, and thus the values of source polygon edge intersections with the boundary planes had to be stored for later recall. Such storage is not necessary when processing in accordance with the present invention, thereby eliminating attendant store and retrieval time cycles.

Terms like supplying, providing, outputting, etc. an edge refer generally to making available appropriate edge descriptors, such as the values of the end points of the edge and/or the equation of the edge, required for additional processing as is known in the art.

Figure 2A:
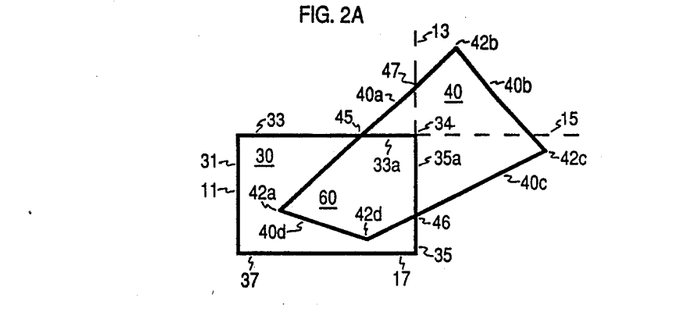
FIGS. 2A-2D illustrate examples of clipping to the view window of FIG. 1 in accordance with the present invention.

Proceeding to examine the case shown in FIG. 2A, assume that the analysis begins at arbitrarily selected vertex 42a of polygon 40 (or first end point 42a of edge 40a). Determine whether end point 42a is within or without view window 30. Since point 42a is within window 30 it is a valid, or potentially visible, point and therefore determine whether the other end 42b of edge 40a is within or without window 30. Since end point 42b is not within window 30, determine outside which boundary plane or planes it lies. Edge 40a crosses two boundary planes —first top 15 and then right 13. Determine gamma point of intersection 45 with top plane 15.

Since a point can lie outside at most two boundary planes, the intersection point of the source polygon edge with the first boundary plane it crosses and outside of which it lies is designated as the alpha intersection point and the intersection point with the next boundary plane it crosses and outside of which it lies is designated as the beta intersection point. The intersection point of an edge, whose first end point is within the window, with a boundary edge of the display window is designated as a gamma intersection point. A gamma intersection point will always be an exit point.

Notice that intersection point 45 is within (on the edge of) window 30. Therefore, assign a code to edge 40a indicating that it exited at top plane 15 and output the valid portion of edge 40a from first end point 42a to gamma intersection point 45 for defining an edge of the clipped figure. The location of intersection point 45 is stored, while the value of edge 40a at intersection point 45 need not be calculated. Also, replace the value of second end point 42b of edge 40a by the value of first intersection point 45, thereby removing the portion of edge 40a disposed between intersection point 45 and end point 42b that lies outside view window 30 from further consideration.

It is not necessary to consider intersection 47 since the portion of edge 40a from intersection 45 (on top plane 15) to end point 42b (outside top plane 15) cannot cross a view window boundary. That is, once an edge of the source polygon exits view window 30, it cannot reenter view window 30 at some other point since the edge is a straight line.

In proceeding around source polygon 40, the next successive edge encountered is edge 40b having a first end point at vertex 42b. First end point 42b of edge 40b is outside top plane 15 and right plane 13 and second end point 42c of edge 40b is outside right plane 13. Since both end points 42b and 42c are outside the same plane, i.e. right plane 13, edge 40b is not potentially visible and can be removed from further consideration. Proceeding clockwise, examine the status of edge 40c starting at vertex 42c. End point 42c is outside right plane 13 and end point 42d is inside right plane 13. Therefore, since end points 42c and 42d are on opposite sides of the same plane 13, determine alpha intersection point 46 of edge 40c with boundary edge 35 and assign a code indicating that edge 40c entered view window 30 at intersection point 46. Also, replace the value of end point 42c with the value of alpha intersection point 46 and store the location of point 46.

Intersection 46 is recognized as the next source polygon edge entry point after the exit of edge 40a at gamma intersection point 45. The system also realizes that in order to connect intersection 45 (exit) with intersection 46 (entry), it is necessary that a valid portion 33a of boundary edge 33, which is disposed between intersection 45 and corner 34 of view window 30, and a valid portion 35a of boundary edge 35, which is disposed between corner 34 of view window 30 and intersection 46, be included as a part of the perimeter of clipped figure 60. That is, valid portions 33a and 35a are derived from the location of, and encoded direction of, edges 40b and 40c at intersection points 45 and 46, respectively.

It is noted that corners between adjacent boundary edges of window 30 are assumed and do not have to be calculated, thereby avoiding additional computation time. After outputting the valid portion of edge 40a that lies between end point 42a and intersection 45, derived edge portions 33a and 35a are output in sequence. The number of edges and their orientation that may lie outside view window 30 along the edge path from intersection 45 to intersection 46 is immaterial, since by adhering to the above stated rules, all such edges must lie entirely outside view window 30.

One benefit of the present invention is that line equations for edge portions 33a and 35a do not have to be calculated. The equations for all boundary edges 31, 33, 35 and 37 are predetermined, and constants for the segments thereof necessary for defining clipped figure 60 are determined from the location of appropriate intersection points of edges of source polygon 40 with boundary edges of view window 30.

Edge 40c is clipped at intersection 46, and the other end 42d of edge 40c is determined to lie within view window 30. Therefore, the valid portion of edge 40c lying between intersection 46 and end point 42d is next outputted as defining a portion of the perimeter of clipped figure 60. Since first end 42d and second end 42a of edge 40d are both within view window 30, the line equation of edge 40d is determined and edge 40d is outputted as the final portion of the perimeter of clipped figure 60. End 42a was the starting point for testing edges of polygon 40 and therefore signifies the end of testing after the source polygon edge for which it constitutes the second end point is tested.

In summary, the above-described clipping process was able to sequentially output portions of the perimeter of clipped figure 60 so that ultimately clipped figure 60 is defined by sequentially adjoining or connecting the portion of edge 40a lying between vertex 42a and intersection 45, boundary edge portion 33a, boundary edge portion 35a, the portion of edge 40c lying between intersection point 46 and vertex 42d, and edge 40d.

Another benefit of the present invention is that it is not necessary to store the valid edge descriptors of the clipped figure in an output edge queue or file. Since the valid edges or portions thereof from polygon 40, and the valid portion of the boundary edges of view window 30 for defining the perimeter of clipped figure 60 are determined in a connectable sequence, the edges of clipped figure 60 can be output sequentially as they are determined, thereby eliminating store and retrieve cycle times.

Figure 2B:
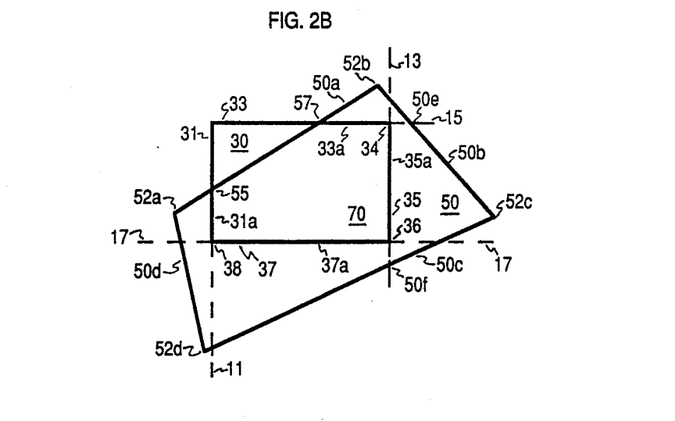

Referring to FIG. 2B, another example of clipping in accordance with the present invention is shown. Assume testing of edges of source polygon 50 begins at arbitrarily selected vertex 52a. Point 52a of edge 50a is determined to be outside left boundary plane 11 of view window 30. The other end 52b of edge 50a lies outside top boundary plane 15 of view window 30. Alpha intersection point 55 with left boundary plane 11 is determined. Intersection point 55 is determined to be valid since it lies on boundary edge 31 of view window 30. An entry code is assigned to intersection point 55. The value of all first determined entry points (i.e. no previous exit point), such as intersection 55, are stored. Edge 50a is clipped at intersection point 55 by replacing the value of end point 52a with the value of intersection 55. Continuing along edge 50a, gamma intersection point 57 is determined and an exit code is assigned. The value of end 52b of edge 50a is replaced with the value of intersection 57. Since a clockwise orientation of vertex descriptors for polygon 50 has been assumed, polygon 50 will lie to the right of edge 50a and thus no valid portions of the boundary edges of view window 30 for clipped figure 70 are yet ascertainable. That is, in order to determine valid portions of the boundary edges of view window 30 for clipped figure 70, it is necessary to have an exit coded intersection followed by an entry coded intersection, wherein the valid portions of the boundary edges of view window 30 lie in a clockwise direction between the exit coded intersection and the entry coded intersection.

Proceeding to vertex 52b, first end point 52b of edge 50b is determined to lie outside upper boundary plane 15 and second end point 52c of edge 50b is determined to lie outside right boundary plane 13. Point 52b and point 52c lie on opposite sides of right boundary plane 13 and upper boundary plane 15. Proceeding from end point 52b toward end point 52c along edge 50b, the alpha intersection 50e of edge 50b with top boundary plane 15 (i.e. plane outside of which end point 52b lies) is identified. The portion of edge 50b between end point 52b and intersection point 50e is disregarded by substituting intersection the value of point 50e for the value of end point 52b. Point 50e is determined not to lie on a boundary edge of view window 30. The remainder of edge 50b is removed from consideration because it cannot constitute a valid edge for clipped figure 70 since point 50e does not lie outside any other boundary plane. First end point 52b and second end point 52c were identified to lie on opposite sides of right boundary plane 13 and edge 50b is a straight line. New end point 50e on right boundary plane 13 did not fall on a boundary edge of view window 30, therefore it is not possible to proceed from point 50e to end point 52c along edge 50b and enter view window 30 at some point along the way.

Next test edge 50c starting at vertex 52c. End point 52c of edge 50c is outside right boundary plane 13 and end point 52d is outside both bottom boundary plane 17 and left boundary plane 11. Alpha intersection 50f of edge 50c with right boundary plane 13 is determined. Since point 50f lies outside view window 30, the portion of edge 50c between end point 52c and intersection point 50f is disregarded from further consideration by substituting the value of intersection point 50f for the value of end point 50c. Since intersection point 50f lies outside bottom boundary plane 17 the rest of edge 50c can be disregarded from further consideration analogously to intersection point 50e and end point 52c of edge 50b. Both first end point 52d and second end point 52a of edge 50d lie outside left boundary plane 11 and therefore edge 50d can be disregarded.

Normally, testing would be completed because the starting point, i.e. vertex 52a, was retested as the second end point of edge 50d. However, since edge 50d was the last edge tested and no entrance point to view window 30 was determined after identifying exit point 57, the initial entry point at intersection 55 is designated as a final entry point for permitting a portion of the boundary edges of view window 30 that constitute the remaining valid edges of clipped figure 70 to be determined. Thus, the portion 33a of boundary edge 33 between intersection 57 and corner 34, boundary edge 35 (designated as edge portion 35a), edge 37 (designated as edge portion 37a) and the portion 31a of boundary edge 31 between corner 38 and intersection 55 are sequentially output to define valid sides of figure 70 within view window 30. In summary, clipped figure 70 is defined by the sequential output of the portion of edge 50a between intersection points 55 and 57, edge portion 33a, edge portion 35a, edge portion 37a and edge portion 31a.

Figure 2C:
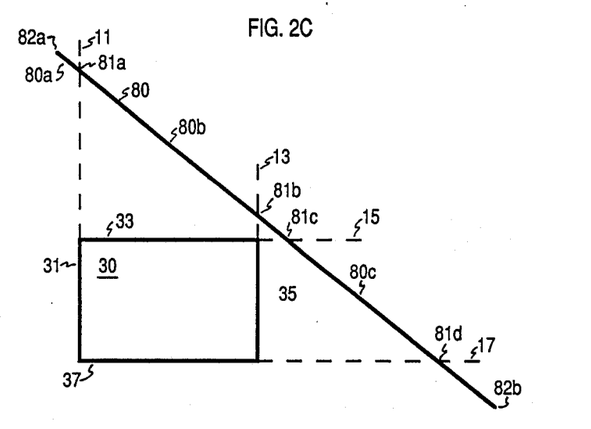

Referring to FIG. 2C, an example of clipping for an illustrative edge of a polygon (not shown) in accordance with the present invention is shown. Edge 80 intersects all four boundary planes 11, 13, 15 and 17 of view window 30 and each end point of edge 80 lies outside two boundary planes. For processing, assume end point 82a designates the first end point of edge 80. Proceeding from end point 82a toward end point 82b, edge 80 is clipped at alpha intersection point 81a between edge and left boundary plane 11, i.e. the first boundary plane encountered outside of which end point 82a lies. Since intersection point 81a does not lie on left boundary edge 31 of window 30, edge 80 is next clipped at beta intersection point 81c between edge 80 and top boundary plane 13, i.e. the second boundary plane encountered outside of which end point 82a lies. Intersection point 81c lies outside right boundary plane 13 but does not lie on top boundary edge 33 of window 30 and second end point 82b lies outside right boundary plane 13 of window 30. Thus, the portion 80c of edge 80 between intersection 81c and end point 82b is disregarded from further consideration. In summary, the entire edge 80 was able to be disregarded from further consideration by obtaining only two intersection points with boundary planes.

For all edge orientations, the validity of an edge or a portion thereof can be determined by identifying no more than two intersections of the edge with the first and second boundary planes that the edge crosses while proceeding from a first end point toward the second end point of the edge. That is, an edge need not be clipped more than twice for determining if valid portions thereof exist. For example, it is not necessary, or desirable, to determine edge 80 intercept point 81b with right boundary plane 13 and/or intercept point 81d with bottom boundary plane 17. Any information obtained from these additional potential clipping points is redundant to information already available from intersection points 81a and 81c for making edge validity decisions. Determining intercepts points 81b and 81d would result in wasting processing time.

Figure 2D:
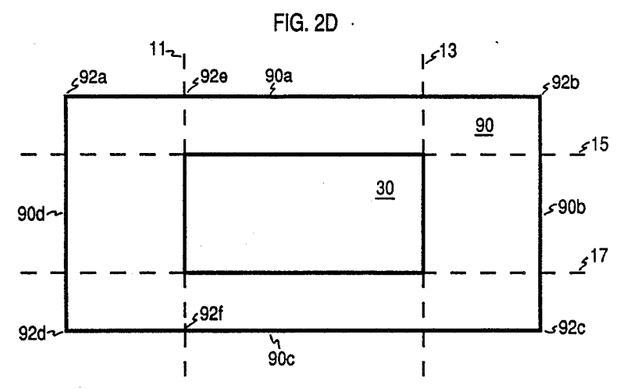

Referring to FIG. 2D, another illustrative case depicting the interaction between the view window and a source polygon is shown. View window 30 is totally surrounded or engulfed by source polygon 90.

Assume testing of edges of source polygon 90 begins at arbitrarily selected vertex 92a. End point 92a of edge 90a lies outside left plane 11 and top plane 15. The other end point 92b of edge 90a lies outside right plane 13 and top plane 15. Therefore edge 90a can be disregarded from further consideration since both end points lie outside top plane 15. However, intersection point 92e of edge 90a with left boundary plane 11 is determined and point 92e is recognized to lie outside, or above, top plane 15 when progressing toward right plane 13 in the predetermined clockwise direction.

When left boundary plane 11 is crossed by an edge of a source polygon while proceeding toward the right (i.e. from outside left plane 11 to inside left plane 11) and the intersection point lies above top plane 15, the system sets an alert flag or identifier (if not already set, or inhibited as explained below). The alert flag indicates the possibility that a source polygon may entirely encircle view window 30.

Proceeding to analyze edge 90b of source polygon 90, first end point 92b lies outside top plane 15 and right plane 13 while the other end point 92c lies outside bottom plane 17 and right plane 13. Since end points 92b and 92c both lie outside right plane 13, edge 90b can be disregarded from further consideration.

Likewise first end point 92c of edge 90c lies outside bottom plane 17 and right plane 13 while the other end point 92d of edge 90c lies outside left plane 11 and bottom plane 17. Since end points 92c and 92d both lie outside bottom plane 17, no portion of edge 90c can be valid. However, intersection point 92f of edge 90c with left boundary plane 11 is determined and point 92f is recognized to lie outside, or below, bottom plane 17 when progressing to the left or from inside left plane 11 to outside left plane 11.

When left boundary plane 11 is crossed by an edge of a source polygon while proceeding from inside left plane 11 to outside left plane 11 and the intersection point lies below bottom plane 17, the system sets the alert flag (if not already set, or inhibited as explained below).

Proceeding to analyze edge 90d of source polygon 90 first end point 92d lies outside left plane 11 and bottom plane 17 and the other end point 92a lies outside top plane 15 and left plane 11. Since end points 92d and 92a both lie outside left plane 11, edge 90d can be disregarded from further consideration.

Since all edges of source polygon 90 have been analyzed and no source polygon edge intersection point with a boundary edge of view window 30 has been ascertained, but the alert flag was set by intersection point 92e and not later reset, the system recognizes that source polygon 90 must totally encircle view window 30. Thus a pseudo-face or figure, whose perimeter includes the boundary edges of view window 30, is defined by sequentially outputting adjacent boundary edges of view window 30.

Several events may cause the alert flag to be reset and/or inhibited while processing edges of a source polygon. The alert flag is reset after processing the last edge of a source polygon in preparation for the next source polygon to be processed. Further, for each source polygon, the occurrence of any of the following events will reset (if set) and inhibit setting of the alert flag for the remainder of the processing of edges for the source polygon being processed. These events include:

(1) Determination of an intersection point between an edge of the source polygon and a view window edge; or (2) Determination of an intersection point between an edge of the source polygon and the left boundary plane, wherein the intersection point lies above the top boundary plane and the edge is being processed in a direction from inside the left boundary plane toward outside the left boundary plane; or (3) Determination of an intersection point between an edge of the source polygon and the left boundary plane, wherein the intersection point lies below the bottom boundary plane and the edge is being processed in a direction from outside the left boundary plane toward inside the left boundary plane.

Although an alert flag would have been set if processing for source polygon 50 of FIG. 2B had begun at vertex 52c, the alert flag would have been reset and further inhibited during processing of polygon 50 in accordance with event 1 above when intersection point 55 was determined. No edges of source polygon 40 of FIG. 2A intersect left plane 11 and thus the alert flag would not be set during processing of polygon 40. Processing of edge 80 of FIG. 2C would set the alert flag when intersection point 81a was determined and whether the alert flag was later reset and inhibited or in a set status after completion of processing the source polygon would depend on the location of the remaining edges (not shown) of the source polygon of which edge 80 constitutes an edge.

Of course, it is not necessary that left boundary plane 11 be used for determining the status of the alert flag. Any other boundary plane may be used analogously to the above described operation between boundary plane 11 and edges of the source polygon being processed for determining the status of the alert flag.

In general, source polygon edge intersections with any first boundary edge plane may be selected for determining the status of the alert flag. The second and third boundary planes, outside of which determinative source polygon edge intersections with the first boundary edge plane occur, are identified as the two boundary edge planes that intersect the first boundary edge plane when the view window is a rectangle. The relevant direction of a source polygon edge intersection with the first boundary plane for setting the alert flag may be determined by traversing a circle surrounding the view window in the predetermined direction (previously assumed to be clockwise) in which the source polygon is processed. The direction in which the first boundary plane is crossed outside of the second and third boundary planes, respectively, is the direction that is used to set the alert flag. It is noted that the view window is always to the right when travelling in the clockwise direction. The opposite direction outside the second and third boundary planes, respectively, are used to reset and/or inhibit the alert flag.

From the foregoing, the following general rules may be extracted, wherein $V_1$ and $V_2$ define the first and second end point (vertex), respectively, of an edge of a source polygon under consideration:

(1) If $V_1$ and $V_2$ are both outside the same boundary plane, then remove the polygon edge from further consideration and proceed to consider the next successive polygon edge having a first end point $V_2$.

(2) If $V_1$ and $V_2$ are on opposite sides of one boundary plane, identify the source polygon edge alpha intersection with the first boundary plane approached that $V_1$ is outside of (proceeding in direction from $V_1$ to $V_2$) and if the alpha intersection point lies on a boundary edge of the view window then the alpha intersection identifies the point and boundary plane at which the source polygon edge under consideration enters the view window. If the alpha intersection point with the first boundary plane approached does not lie on a boundary edge of the view window, then the entire source polygon edge can be removed from further consideration.

(3) If $V_1$ and $V_2$ are not on opposite sides of one boundary plane, identify a source polygon edge alpha intersection with the first boundary plane approached that $V_1$ is outside of, and if the alpha intersection point lies on a boundary edge of the view window then the alpha intersection identifies the point and boundary plane at which the source polygon edge under consideration enters the view window. If the alpha intersection point does no lie on a boundary edge of the view window, then identify a source polygon edge beta intersection with the next boundary plane approached outside of which $V_1$ lies. If the beta intersection point lies on a boundary edge of the view window, then the beta intersection identifies the point and boundary plane at which the polygon edge under consideration enters the view window. If the beta intersection point does not lie on a boundary edge of the view window, then the entire source polygon edge can be removed from further consideration.

Figure 3A:
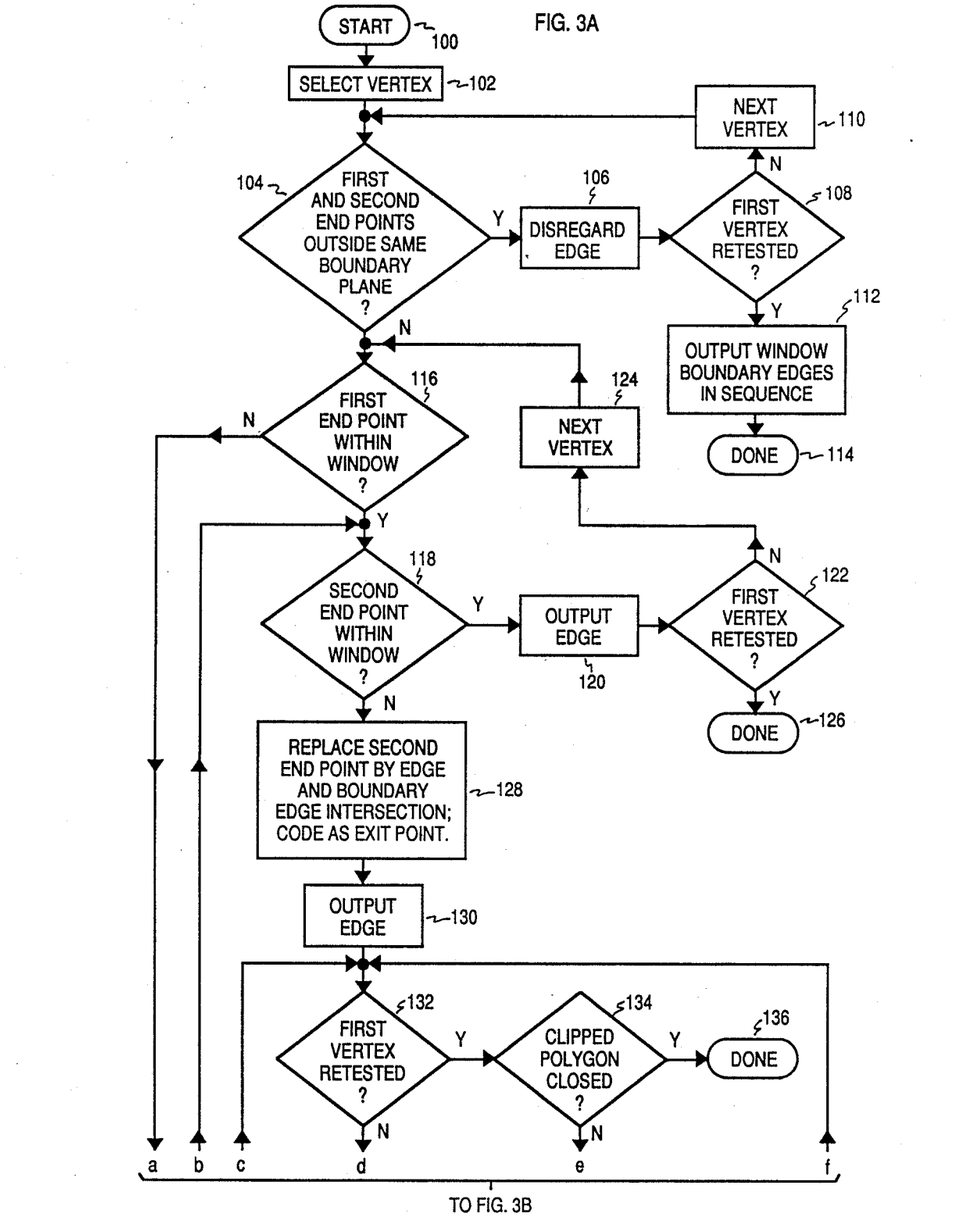
FIGS. 3A and 3B illustrate a flow diagram of clipping to the view window of FIG. 1 in accordance with the present invention.
Figure 3B:
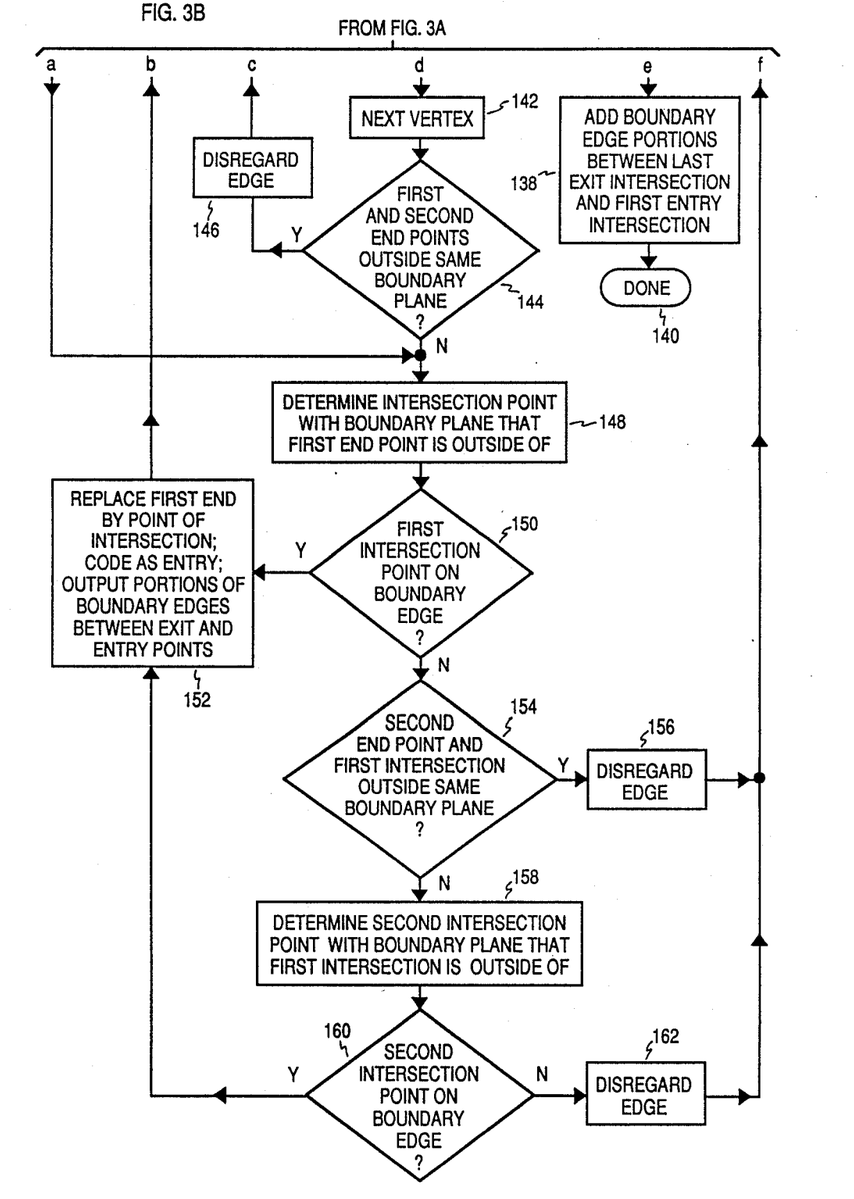

Referring to FIGS. 3A and 3B a flow diagram of clipping to the view window of FIG. 1 in accordance with the present invention is shwon.

The method begins at step 100 and proceeds to execute step 102 which selects a vertex of an edge of a polygon to be tested. Performance of step 104 determines if the first and second end points of the edge lie outside the same boundary plane. If both end points do lie outside the same boundary plane, the yes or Y path is followed and execution of step 106 disregards the edge from further consideration. Performance of step 108 determines if the first vertex selected has been retested as a second edge point of an edge. If the first vertex selected has not been retested, then the no or N path is followed and execution of step 110 selects the next vertex of the polygon to be tested. Steps 104, 106 and 108 are repeated as required. If the first vertex selected has been retested then the Y path from step 108 is followed and execution of step 112 outputs the window boundary edges in sequence. Performance of step 114 indicates that the processing of the polygon under consideration has been completed.

If the first and second end points are not outside the same boundary plane when step 104 is performed then execution of step 116 determines if the first end point of the edge is within the view window. If the first end point is within the view window, the Y path is followed and performance of step 118 determines if the second end point is within the view window. If the second end point is within the view window, the Y path is followed and execution of step 120 outputs the entire edge as the valid portion of the edge. Performance of step 122 determines if the first vertex has been retested as the second end point of an edge. If the first vertex has been retested as the second end point of an edge, following the Y path, performance of step 126 indicates that the processing of the polygon under consideration has been completed. If not, following the N path from step 122, execution of step 124 selects the next vertex to be tested and testing begins at step 116.

If the first end point is not within the view window when step 116 is performed, then following the N path, execution of step 148 determines the intersection point of the edge under test with the first boundary plane outside of which the first end point of the edge lies. Proceeding to perform step 150, a determination is made as to whether the first intersection point is on a boundary edge of the view window. If the first intersection point is on a boundary edge, then following the Y path, step 152 is performed to replace the value of the first end of the edge with the value of the point of intersection, code the piont of intersection as an entry point, and output portions of the boundary edges lying between the next previous exit point and the entry point. Execution of step 118 is repeated.

If the first intersection point is not on a boundary edge of the view window when step 150 is performed, then the N path is followed and performance of step 154 determines if the second end point of the edge and the first intersection point with a boundary plane both lie outside the same boundary plane. If the both lie outside the same boundary lane, then the Y path is followed and performance of step 156 disregards the edge from further consideration. Step 132 is then performed as described below. If both points do not lie outside the same boundary plane when step 154 is performed then the N path is followed and execution of step 158 determines the second interesection point with the next boundary plane that the first intersection point is outside of when proceeding along the edge in a direction from the original first end point to the section end point.

Proceeding the execute step 160, it is determined whether the second boundary plane intersection point is on a boundary edge of the view window. If it is not, the N path is followed and performance of step 162 disregards the edge from further consideration. Step 132 is then performed as described below. If the second boundary plane intersection point is on a boundary edge of the view window when step 160 is performed, the Y path is followed and step 152 is executed.

If the second end point of the edge under consideration is not within the view window when step 118 is performed, then the N path is followed and execution of step 128 replaces the second end point by the intersection point of the edge under consideration and the boundary edge of the view window and codes this intersection point as an exit point. Execution of step 130 output the valid portion of the edge.

Performance of step 132 determines if the first vertex has been retested as the second end point of an edge. If it has, the Y path is followed and execution of step 134 determines if the clipped polygon is closed. If it is closed when step 134 is performed, then the Y path is followed and execution of step 136 indicates that clipping of the polygon under test has been completed. If it is not closed when step 134 is performed, the execution of step 138 outputs in sequence the boundary edge portions of the view window that lie between the last identified exit intersection point on the boundary edge and the first identified entry intersection point on the boundary edge. Execution of step 140 indicates that clipping of the polygon under test has been completed.

If the first vertex has not been retested when step 132 is performed, then the N path is followed and execution of step 142 selects the next vertex to be tested. Performance of step 144 determines if the first and second end points of the edge lie outside the same boundary plane. If they do, then the Y path is followed and performance of step 146 disregards the edge from further consideration. Execution of step 132 is then repeated. If the first and second end point do not lie outside the same boundary plane when step 144 is performed, then step 148 is executed.

Figure 4:
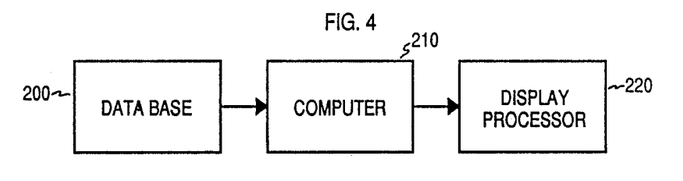
FIG. 4 shows a bock diagram of hardware useful with the present invention.

Referring to FIG. 4, a block diagram of hardware useful with the present invention is shown. Three-dimensional descriptors of polygons are stored in a data base 200. Data base 200 provides or supplies these descriptors as required to a computer 210 in which may reside a program in accordance with FIGS. 3A and 3B. Computer 210 outputs or supplies the valid portion of edges to a display processor 220.

Thus, has been illustrated and described a method for clipping a polygon in two dimensions wherein the resulting clipped segments may be more rapidly obtained than from known methods. Further shown and described is a method for clipping wherein all boundary edges for the resulting clipped figure may be readily determined and contiguous edges of the clipped figure may be sequentially output when determined without need to store edge equations and while processing to determine the next contiguous edge.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for clipping a convex source polygon to a view-window defined by boundary edges for forming a clipped figure, wherein a respective boundary edge plane coinciding with each boundary edge of the view window is predeterminedly defined, comprising:
    determining intersection points between edges of the source polygon and boundary edges of the view window while proceeding from a randomly selected vertex of the source polygon in a predetermined direction around the perimeter of the source polygon;
    assigning each intersection point determined as either an entry point to, or an exit point from, the view window in response to the predetermined direction along the edge of the source polygon forming the respective intersection point;
    sequentially supplying as encountered in the predetermined direction around the perimeter of the source polygon: source polygon edges that lie entirely within the view window, valid portions of source polygon edges that include an exit point and/or an entry point, and a valid portion of the boundary edges of the view window from an exit point to the next determined entry point before supplying the valid portion of the source polygon edge that includes the next determined entry point; and
    substituting the value of the first entry point determined for the value of the next determined entry point when a last exit point assigned does not include a corresponding next determined entry point after the step of determining has returned to the randomly selected vertex,
    wherein the step of sequentially supplying is performed while the edges of the clipped figure are being determined without having to recall the valid portion of the edge of the source polygon and the portion of the boundary edges of the view window from the first determined exit point to the entry point next determined.

2. The method as in claim 1, wherein the source polygon is defined in three dimensions and further including the step of projecting the source polygon into two dimensions before the step of determining is performed.

3. The method as in claim 1, further including substituting the value of the entry point for the value of the first end point of the edge of the source polygon forming the respective entry point and substituting the value of the exit point for the value of the second end point of the edge of the source polygon forming the respective exit point.

4. The method as in claim 1, further including disregarding from further consideration any edge of the source polygon for which both end points of the any edge lie outside the same boundary edge plane.

5. The method as in claim 1, wherein, for each edge of the source polygon, the step of determining further includes:
    determining an alpha intersection point of an edge of the source polygon with a first boundary edge plane the edge crosses when the first end point and second end point of the edge lie on opposite sides of the first boundary edge plane;
    assigning an appropriate exit or entry code to the alpha intersection point and replacing the value of the first end point of the edge with the value of the alpha intersection point when the alpha intersection point lies on a boundary edge;
    disregarding the edge from further consideration when the second end point of the edge lies outside the first boundary plane;
    determining a beta intersection point of the edge with the second boundary edge plane that the edge crosses when the alpha intersection point and the second end point of the edge lie on opposite sides of the second boundary edge plane when the alpha intersection point does not lie on a boundary edge;

assigning an appropriate entry or exit code to the beta intersection point and replacing the value of the alpha intersection point with the value of the beta intersection point when the beta intersection point lies on a boundary edge; and disregarding the edge from further consideration when the beta intersection point does not lie on a boundary edge.

6. The method as in claim 1, further including providing the boundary edges of the view window in a connected order for defining the perimeter of the clipped figure when the source polygon encircles the view window.

7. The method as in claim 6, wherein the view window is rectangular and further wherein the step of providing further includes outputting the boundary edges of the view window in a sequential connected order when a first edge of the source polygon intersects a predetermined first boundary plane from outside to inside the first boundary plane when proceeding in the predetermined direction along the first edge, the first edge intersecting the first boundary plane outside a predetermined second boundary plane that intersects the first boundary plane and when a second edge of the source polygon intersects the first boundary plane from inside to outside the first boundary plane when proceeding in the predetermined direction along the second edge, the second edge intersecting the first boundary plane outside a predetermined third boundary plane that intersects the first boundary plane unless a third edge of the source polygon intersects a boundary edge of the view window or a fourth edge of the source polygon intersects the first boundary plane outside the second boundary plane from inside to outside the first boundary plane when proceeding in the predetermined direction along the fourth edge, or a fifth edge of the source polygon intersects the first boundary plane outside the third boundary plane from outside to inside the first boundary plane when proceeding in the predetermined direction along the fifth edge.

8. A method for forming a clipped figure from the interaction between a convex source polygon and a view window defined by boundary edges, wherein a respective boundary plane corresponding to each boundary edge so that the window lies inside each boundary plane, comprising:

determining a valid portion of edges of the source polygon in a predetermined direction around the perimeter of the source polygon that form a part of the perimeter of the clipped figure;

identifying in response to the valid portion of edges of the source polygon a derived portion of the boundary edges that forms another part of the perimeter of the clipped figure; and providing the valid portion and the derived portion so that the perimeter of the clipped figure may be sequentially defined in a predetermined direction along the perimeter of the clipped figure by adjoining valid and derived portions such that the derived portion lying between an exit intersection point of the valid portion and a next determined entry intersection point of the valid portion may be provided before determining the valid portion following the next determined entry intersection point.

9. The method as in claim 8, where for each successive edge of the source polygon in a predetermined direction around the perimeter of the source polygon the step of determining includes:

disregarding a source polygon edge and proceeding to consider the next successive source polygon edge when both end points of the source polygon edge lie outside the same boundary plane;

determining a first intersection point of the source polygon edge with a first boundary plane outside of which the first end point of the source polygon edge lies;

coding the first intersection point as an entry point and replacing the value of the first intersection point by the value of the first end point of the source polygon edge when the first intersection point lies on a boundary edge of the view window;

disregarding the source polygon edge when the first intersection point and the second end point of the source polygon edge lie outside the same boundary plane;

determining a second intersection point of the source polygon edge with a second boundary plane outside of which the first intersection point lies;

coding the second intersection point as an entry point and replacing the value of the first intersection point by the value of the second intersection point when the second intersection point lies on a boundary edge of the view window;

disregarding the source polygon edge and proceeding to consider the next succeeding source polygon edge when the second intersection point does not lie on a boundary edge of the view window;

identifying the source polygon edge as a valid edge when the first and second end points of the polygon edge lie within the view window.

10. A method for clipping a convex source polygon to a view window for forming a clipped figure, wherein the view window is defined by boundary edges and a respective boundary edge plane coinciding with each boundary edge, each boundary edge plane dividing space into an inside region and an outside region disposed on opposite sides of each boundary plane and the view window further disposed in the inside region of each boundary edge plane, for each consecutive edge encountered in a predetermined direction around the perimeter of the source polygon from a predetermined vertex of the source polygon wherein each edge of the source polygon includes a first end point ($V_1$) and a second end point ($V_2$), the method comprising:

(a) disregarding the source polygon edge from further consideration when the points $V_1$ and $V_2$ lie in the outside region of the same boundary plane;

(b) determining an alpha intersection point of the source polygon edge with the first boundary plane encountered outside of which $V_1$ lies when proceeding from $V_1$ to $V_2$;

(c) coding the alpha intersection point as an entry point and replacing the value of $V_1$ with the value of the alpha intersection point when the alpha intersection point lies on a boundary edge of the view window;

(d) disregarding the source polygon edge from further consideration when the alpha intersection point and $V_2$ lie in the outside region of the same boundary plane;

(e) determining a beta intersection point of the source polygon edge with the second boundary plane encountered outside of which the alpha intersection point lies when proceeding from the alpha intersection point to $V_2$ whenever the alpha intersection point and $V_2$ do not lie in the outside region of the same boundary plane and the alpha intersection point does not lie on a boundary edge of the view window;

(f) disregarding the source polygon edge from further consideration when the beta intersection point does not lie on a boundary edge of the view window;

(g) coding the beta intersection point as an entry point and replacing the value of the alpha intersection point with the value of the beta intersection point when the beta intersection point lies on a boundary edge of the view window;

(h) coding a gamma intersection point of the source polygon edge with the first boundary plane encountered when proceeding from $V_1$ to $V_2$ as an exit point and replacing the value of $V_2$ with the value of the gamma intersection point whenever $V_1$, the alpha intersection point or the beta intersection point lies within the view window and $V_2$ lies outside a boundary plane;

(i) deriving the valid portion of the boundary edges of the view window that form a portion of the perimeter of the clipped figure from a gamma intersection point and the next determined alpha or beta intersection point coded as an entry point; and (j) sequentially providing the valid portion of the source polygon edges and the valid portion of the boundary edges of the view window for forming contiguous portions of the perimeter of the clipped figure while the alpha, beta and gamma intersections are being determined.

11. The method as in claim 10, further including providing the boundary edges of the view window in a connected order for defining the perimeter of the clipped figure when the source polygon encircles the view window.

12. The method as in claim 11, wherein the view window is rectangular and further wherein the step of providing further includes outputting the boundary edges of the view window in a sequential connected order when a first edge of the source polygon intersects a predetermined first boundary plane from outside to inside the first boundary plane when proceeding in the predetermined direction along the first edge, the first edge intersecting the first boundary plane outside a predetermined second boundary plane that intersects the first boundary plane and when a second edge of the source polygon intersects the first boundary plane from inside to outside the first boundary plane when proceeding in the predetermined direction along the second edge, the second edge intersecting the first boundary plane outside a predetermined third boundary plane that intersects the first boundary plane unless a third edge of the source polygon intersects a boundary edge of the view window or a fourth edge of the source polygon intersects the first boundary plane outside the second boundary plane from inside to outside the first boundary plane when proceeding in the predetermined direction along the fourth edge, or a fifth edge of the source polygon intersects the first boundary plane outside the third boundary plane from outside to inside the first boundary plane when proceeding in the predetermined direction along the fifth edge.

* * * * *